United States Patent [19]
Conrad et al.

[11] Patent Number: 5,748,929
[45] Date of Patent: *May 5, 1998

[54] PROGRAM STORAGE DEVICE AND COMPUTER PROGRAM PRODUCT FOR INTERACTIVELY MANAGING A DISTRIBUTED DATABASE SYSTEM

[75] Inventors: Thomas E. Conrad, Morgan Hill; Garry L. Haas, San Jose, both of Calif.

[73] Assignee: International Business Machines Corporation, Armonk, N.Y.

[*] Notice: The term of this patent shall not extend beyond the expiration date of Pat. No. 5,539,870.

[21] Appl. No.: 462,685

[22] Filed: Jun. 5, 1995

Related U.S. Application Data

[62] Division of Ser. No. 956,942, Oct. 5, 1992, Pat. No. 5,539,870.

[51] Int. Cl.⁶ .................................................. G06F 17/30
[52] U.S. Cl. ............................................................ 395/352
[58] Field of Search ............................... 395/161, 155, 395/157, 600, 162, 352

[56] References Cited

U.S. PATENT DOCUMENTS

| | | | |
|---|---|---|---|
| 5,448,736 | 9/1995 | Yussa et al. | 395/700 |
| 5,493,682 | 2/1996 | Tyra et al. | 395/700 |

Primary Examiner—David L. Robertson
Attorney, Agent, or Firm—Sterne, Kessler, Goldstein & Fox P.L.L.C.; David J. Kappos, Esq.

[57] ABSTRACT

An interactive graphical display of object relationships and instances is implemented by means of a table driven process. The user can select one or more object occurrences and then select an action to be performed on the selected object occurrences using a dynamic menu of actions. Changes are made to the tables without modifying the processes. The process can be used in managing a distributed database system to provide a user with increasingly detailed levels of information about object types and occurrences in the database systems.

13 Claims, 13 Drawing Sheets

| Action 90 | Object 91 | Type Occurrence | Database | Program Name |
|---|---|---|---|---|
| Display | HOST | T | | 92 HDISP.EXE |
| Display | TABLE | T | | EMQSTIN.EXE |
| Display | VIEW | T | | EMQSTIN.EXE |
| Display | USERID | T | | EMQSTIN.EXE |
| Display | AUTHORIZATION | T | | EMQSTIN.EXE |
| Display | DATABASE | T | | EMQSTIN.EXE |
| Copy | TABLE | O | DSN | EMQCOPY.EXE |
| Copy | VIEW | O | | EMQCOPY.EXE |
| Copy | INDEX | O | | EMQCOPY.EXE |
| Copy | AUTHORIZATION | B | | EMQADD.EXE |
| Add | AUTHORIZATION | B | | EMQDEL.EXE |
| Delete | AUTHORIZATION | O | DSN | EMQBAC1.EXE |
| Backup | TABLE | B | QSQ | EMQBAC2.EXE |
| Backup | TABLE | O | | EMQBAC3.EXE |
| Backup | TABLE | | | |

FIG. 4

| OBJECT | RELATED OBJECT | DATABASE | QUALIFIER |
|--------|----------------|----------|-----------|
| HOST   | RDB            | ARI      | RDB       |
| HOST   | RDBMS WORK     | ARI      | RDBMS     |
| TABLE  | VIEW           | DSN      | TABLE     |
| TABLE  | VIEW           | ARI      | NAME      |
| TABLE  | VIEW           | ARI      | TABLE     |
| TABLE  | AUTHS          | DSN      | RDB*      |
| TABLE  | INDEX          | DSN      | Name      |
| VIEW   | INDEX          | ARI      | VIEW      |
| VIEW   | TABLE          | DSN      | RDB       |
| VIEW   | VIEW_AUTHS     | DSN      | USER_ID   |
| ⋮      | ⋮              | ⋮        | ⋮         |

FIG. 5

PROGRAM STORAGE DEVICE AND COMPUTER PROGRAM PRODUCT FOR INTERACTIVELY MANAGING A DISTRIBUTED DATABASE SYSTEM

This application is a division of application Ser. No. 07/956,942, filed Oct. 5, 1992, U.S. Pat. No. 5,539,870.

FIELD OF THE INVENTION

This invention relates to computer systems having database management systems for storing, organizing and retrieving data. More particularly, this invention relates to managing a distributed database management system (DBMS) interconnecting different types of database management systems.

BACKGROUND OF THE INVENTION

In a dynamic business environment, where timely access to data is important, computerized databases are commonly used to store data for easy retrieval and organization. The data is stored electronically in mass storage devices. Several computer software programs collectively called a database management system are used to manipulate the data for retrieval, deletion, updates and storage. A database administrator (DBA) is responsible for organizing, monitoring and reorganizing the logical database structure.

One type of DBMS used by many enterprises is a relational database management system (RDBMS). An RDBMS is a body of related information stored in a computer organized as tables having columns and rows. The columns correspond to attributes of relations and rows correspond to a relation grouping called a tuple. For example, an inventory table could have attributes such as an inventory item number, a description of the item, a quantity in stock, a price and a supplier. Each column corresponds to an attribute and each row is a tuple comprising the attributes for a given item.

Large enterprises with many remote business locations frequently have data stored at each separate location. For example, a large retail business having numerous outlets many miles away from each other could have separate databases at each location keeping track of that store's inventory.

The local databases are accessible by local sales staff for information about items in stock locally. However, central purchasing staff for the business also need to access the information regarding each store's inventory.

The databases at each location can be linked together through communications systems so that the databases can all be reached from a central location. A distributed relational database network consists of a collection of tables spread across a number of computer systems having the same or different types of DBMSs that are interconnected in a network. Each computer system in the network has its own DBMS to manage data locally stored in its environment. Each of the remote locations may be using one of many different DBMSs that are currently available. These DBMS types and each version release have different features and functionalities.

Accessing data from remote locations can be difficult for both database users trying to retrieve information from databases and for programmers creating programs using the data. It is even more difficult to access data at a remote location which has a different DBMS.

For large enterprises having many remote locations with different DBMSs, a DBA has to know many different DBMS commands, syntax and structure to access or control access to data at each remote site. Also, to perform the necessary maintenance duties, a DBA also needs to know each remote system, the database system types that are on each system, the databases, contents of each database (e.g., tables and table columns) and the authorizations allowed for each part of each database.

The database type, the database, and the authorization are termed object types, while the actual databases stored in the systems, the tables in the database, the columns of the tables, and the authorizations on each table and column are termed occurrences or instances of a system object type. Materialization of objects refers to the process of creating objects by retrieving and organizing data. The DBAs need to know the object types in a system, the object occurrences, the relationships between objects, the actions that can be performed on a given object, and the way the objects are materialized for each of the systems in the network.

DBAs managing a distributed relational database environment need to be able to determine the status of various systems in the network, perform actions on the data such as moving and copying data between the computer systems, adding and deleting objects such as data items and authorizations, and backing up systems. When each computer system in the distributed network has a different command set and syntax used by the operating system and DBMS, there is an even greater need for an interactive menu driven interface for managing activities over all of the systems.

Therefore, there is a need for a centralized method of managing all of the systems in a distributed database system. It is important for such a system to be menu driven and to be interactive with the user to provide information on the system and the objects and the relationships between objects stored in the system.

There is also a need for flexibility in the design of the interactive menu driven system managing a distributed database system. Typically the distributed systems are continually being changed to contain new object occurrences or instances (such as a particular table), object types (such as a new type of authorization privilege), and relationships between object types and the actions to be performed on object occurrences. Prior programming methods of encoding algorithms for obtaining entity-type and entity-instance relationships and the related program functions to perform various actions on the object instances (occurrences) have typically required the creation of specific purpose code which is unique to the relationship of entities, the entity-type or the instance materialization technique. Traditionally, the specialized materialization code is embedded in each program that processes that entity or object. For example, it is common practice to embed within a program module the programming algorithm necessary to locate entity-to-entity relationships, determine methods of materializing specific instances of the relationship, call methods of materializing specific to instances of the entities, and optionally providing for addition of new object types and actions. This practice results in duplication of effort when the entities are involved in multiple solutions as occurs in managing a distributed system. Therefore, for managing a distributed system, there is a particular need for using a management system object display logic that is decoupled from object instance identification or materialization logic.

SUMMARY OF THE INVENTION

In one embodiment of the invention a method is provided for determining object types and occurrences existing in a computer system at progressively greater levels of details and for performing actions on selected object occurrences. A user is prompted with the types of detail information that are available about an object and the actions that are performable for the object so that the user does not have to be familiar with the computer system. A menu driven process provides an interactive graphical display of object relationships and instances or occurrences. The user can navigate through a network or hierarchy of displayed objects selecting instances as appropriate and then optionally selecting actions to be performed on the prior chosen item or items.

In another embodiment of the invention a process is provided which provides for the flexible updating of an object display system with additional object types and occurrences and performable actions. The object display and selection logic is decoupled from the object instance relationship generation logic while retaining the ability to later add new object definitions relationship instance materialization code and object process logic code without requiring changes to the original object display and navigation code.

In a distributed data processing system including a plurality of computer systems, each having a central processing unit (CPU), memory, a database stored in the memory, a database management system (DBMS), and communications means, a method is provided for managing the distributed data processing system from a computer system having a display device and a user interaction device. An object listing displayed on the display device is interactively modifiable using input from the user interaction device and control information accessible from a set of at least one table stored in the distributed system. An action is selected to be performed on a user selected list of at least one object occurrence from the object listing using input from the user interaction device and control information from a set of at least one table stored in the distributed system. The selected action is performed on the selected object occurrence list, by means of the CPU executing a list of at least one program stored in the distributed system, wherein the program list is identified using the set of at least one table stored in the distributed system. Examples of actions that can be performed on selected object occurrences are copying of data items or authorizations to another system, backing up a system, and adding or deleting data items or authorizations.

It is an object of the invention to allow for changes and updates to the related object definitions, relationships and instance materialization without having to change the display and navigation process itself. Information regarding the logic of generating objects and occurrences and their relationships into tables instead of embedding the logic information in the display and navigation code. In one embodiment of the invention, the tables that are used are a Related Object Table and an Object Action Table. The Related Object Table contains a list of object types and their related object types. The Object Action Table contains a list of object types paired with object type actions and the program to be run in order to return a list of occurrences.

In one form of the invention a method is provided for interactively displaying a hierarchical list of related objects. A list of occurrences of object types is displayed on a display device. Input is received from a user interaction device selecting a displayed object occurrence. A list of at least one object type related to the selected object occurrence is identified using a table stored in the distributed system. The related object type list is displayed on a portion of the display device. Input is received from the user interaction device selecting a displayed related object type. A list of at least one occurrence of the selected object type is identified using a program stored in the distributed system, wherein the program is identified using a set of at least one table stored in the distributed system. The object occurrence list is displayed on the display device.

In another form of the invention, a list of at least one occurrence of a computer system object type is displayed on a display device. Input is received from a user interaction device, selecting a displayed object occurrence. A table stored in the distributed system is used to identify a list of at least one object type related to the selected occurrence. The related object type list is displayed on the display device. Input is received from the user interaction device selecting a related object type. A table stored in the distributed system is used to identify a program to retrieve a list of zero or more occurrences of the selected object type. The program identified by the table is executed by the CPU. The retrieved object list is then displayed on the display device. This process is repeated a plurality of times until input is received by the interaction device to perform a non-display action on a selected list of at least one object occurrence. A table stored in the distributed system is used to identify a list of the performable actions for the selected object occurrence list. The action list is displayed on the display device. Input is received from the user interaction device selecting an action. A table stored in the distributed system is used to identify programs which perform the selected action for the selected occurrence list. The programs are identified through an Object-Action table and executed by the CPU. This entire process can be repeated a plurality of times until input is received from the user interaction device to stop the process.

BRIEF DESCRIPTION OF THE FIGURES

FIG. 4 is an Object Action Table of a preferred embodiment of the present invention;

FIG. 5 is a Related Object Table of a preferred embodiment of the present invention;

DESCRIPTION OF THE INVENTION

Figure 1:
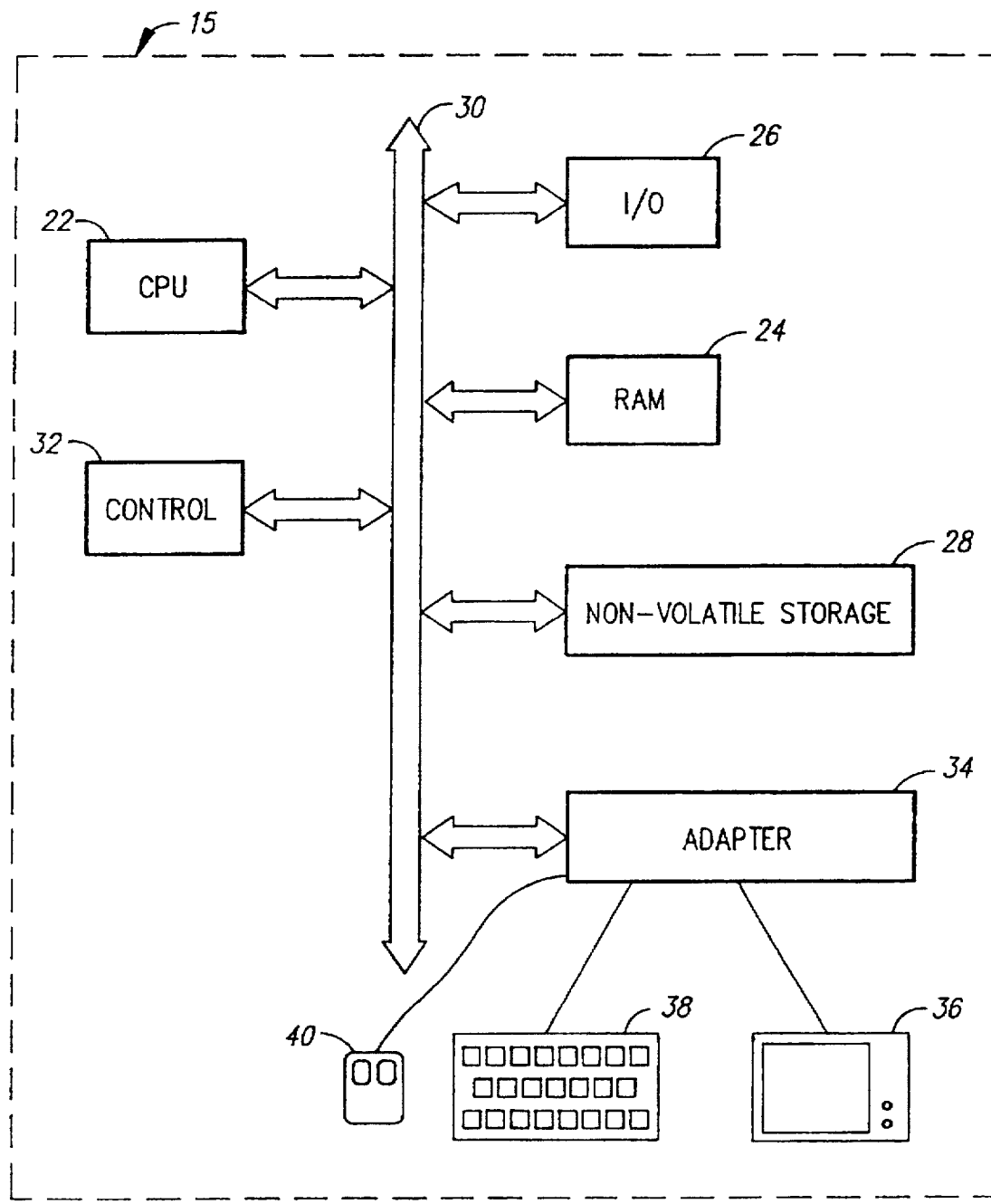
FIG. 1 is a detailed schematic of a conventional computer system.

FIG. 1 shows a data processing apparatus 15 with which the present invention may be practiced. The apparatus 15 comprises a central processing unit (CPU) 22, a random access memory (RAM) 24, input/output (I/O) port 26 and nonvolatile storage 28 such as disk storage or read only memory (ROM), all connected to a common bus structure 30. The CPU runs or executes programs that are stored in the memory (either the RAM or the nonvolatile storage). Control circuitry 32 performs housekeeping operations such as providing appropriate clock signals and controlling the operation of the bus 30. An adapter 34 may be used to interface to other components that interact with a system user such as a visual display unit or terminal 36, and user interaction devices such as a keyboard 38 and a mouse 40. The implementing environment also includes what is called a window, display screen, or view port which provides means for displaying rows of data and other information to the user. The general purpose data processor shown in FIG. 1 can be used to perform the invention under the program control outlined in the flowchart of FIG. 6.

Figure 2:
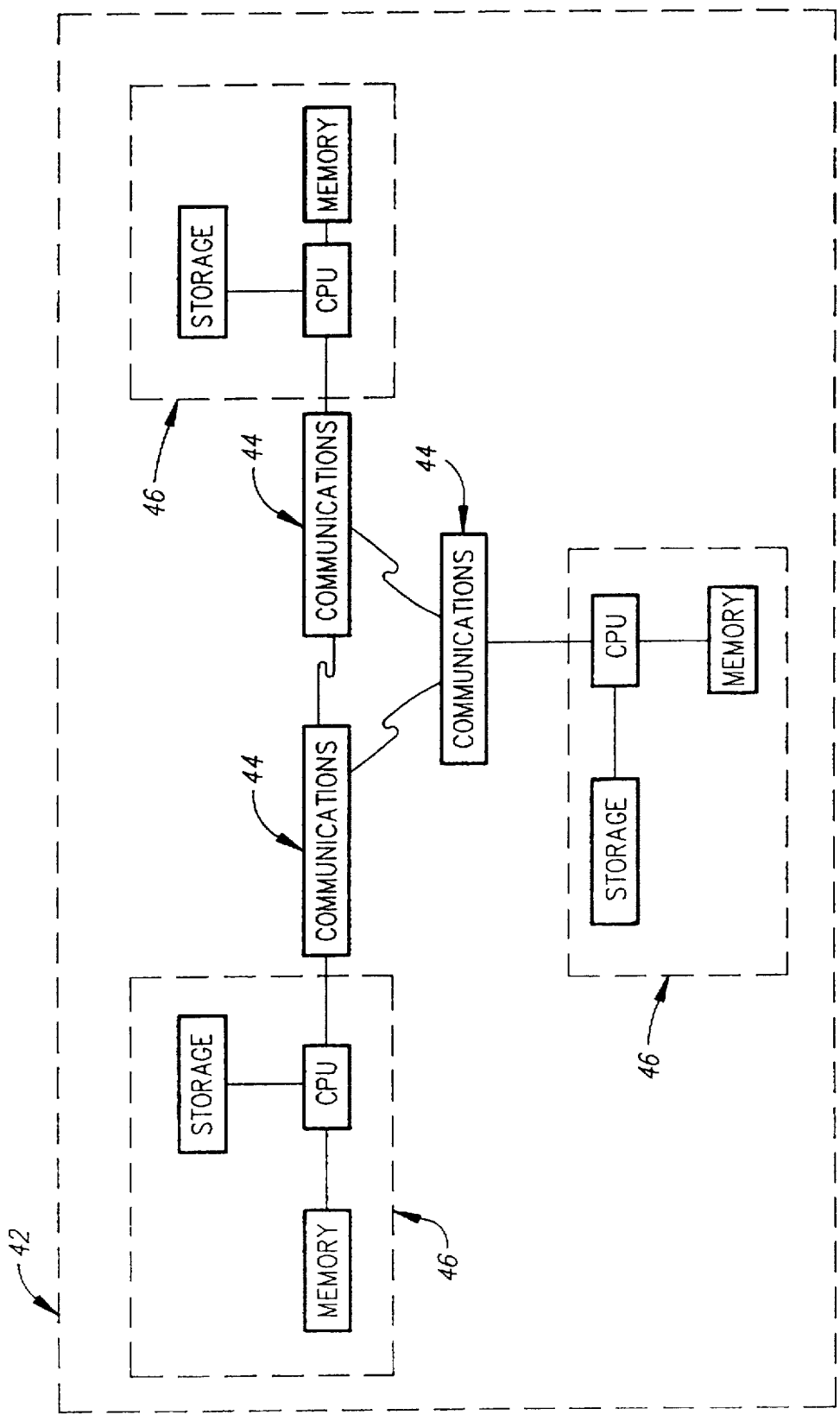
FIG. 2 is a schematic diagram of a conventional distributed data processing system.

FIG. 2 shows a distributed data processing system 42 where a communication system 44 is used to interconnect a plurality of computer systems 46. Each computer system 46 is similar to the system shown in FIG. 1, and has one or more databases stored in the nonvolatile storage and one or more database management system (DBMS) programs run by the CPU to manage the databases. The DBMSs of the different systems can be different types of DBMSs (including RDBMSs) with different commands and syntax. In the preferred embodiment, the distributed system is managed from a programmable work station. However, the system can be managed by any of the computer systems. The invention can also be used for a single computer system that is not part of a distributed system.

Figure 3:
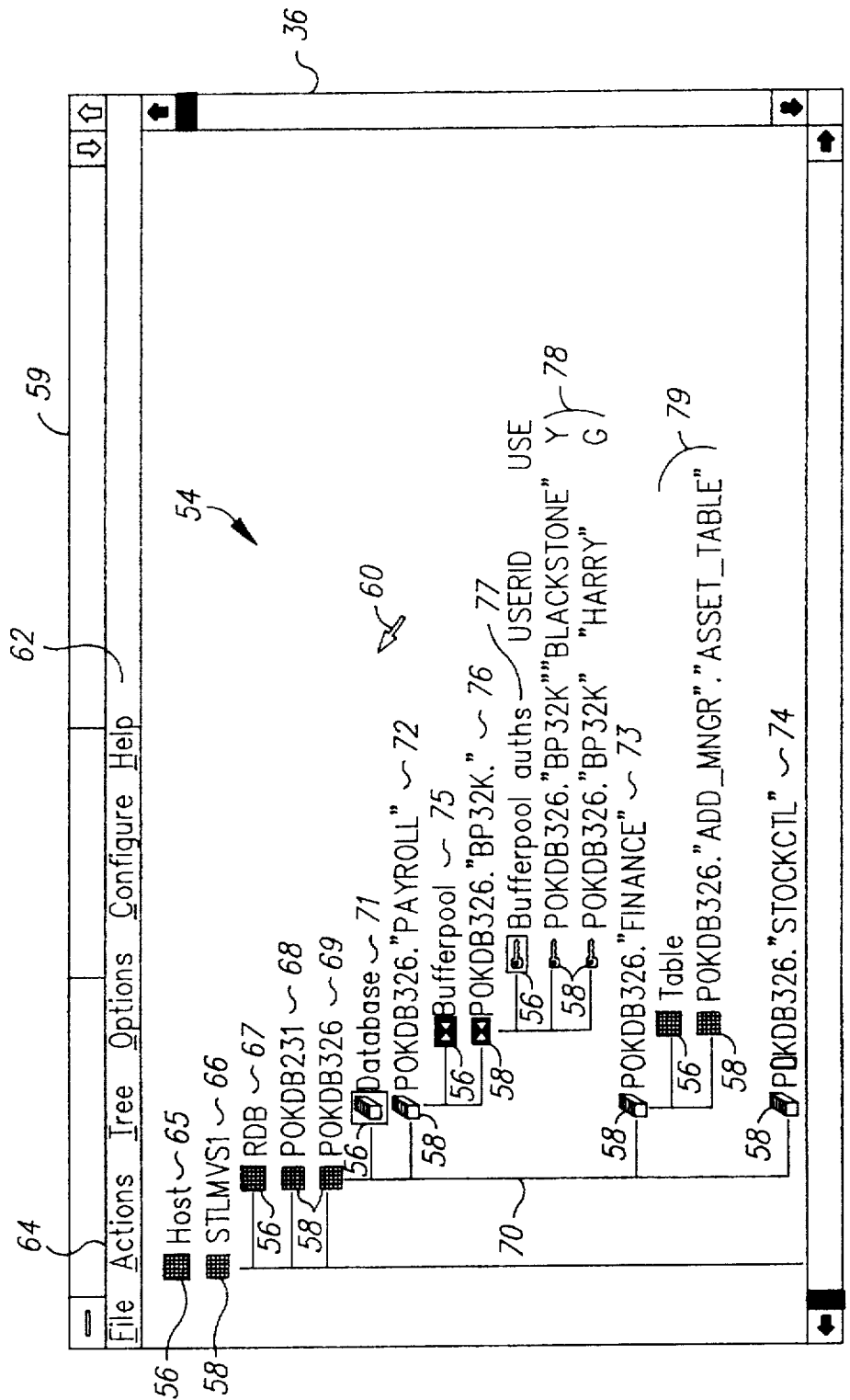
FIG. 3 is an object listing display of related object types and occurrences according to the present invention.

Referring to FIG. 3, an object listing display 54 of related object types 56 and object occurrences (instances) 58 is shown displayed in a window 59 of a visual display unit 36. At any time, a user can select one or more object occurrences 58 displayed in the window using a keyboard or mouse to position a cursor 60 on an object occurrence and then send a signal to indicate the selection. When using a mouse, the selection process is called "clicking" on an item. A list of more than one object occurrence can be selected by positioning a mouse cursor next to a group of object occurrences, continuing to press the mouse button while moving the mouse cursor over object occurrences until all selections are highlighted and then signalling that the selection has been made. There are many other ways to interactively select from a list of display items as commonly known in the field, such as using a touch screen display.

The menu bar 62 at the top of the window 59 provides pull down menu options for configuring the system and controlling the display. The "Action" option 64 can be selected using the user interaction device. Selecting "Action" causes a menu of action options to be displayed. The menu is used to select an action to be performed on selected objects (as will be described in greater detail below).

The objects and relationships shown in FIG. 3 and used for describing the invention pertain to the distributed system 42, such as host systems, databases, tables, and authorizations. The table driven process for interactively navigating through related object types and occurrences and optionally selecting an action to be performed on selected object occurrences can be used for other categories of objects.

Referring to FIG. 3, the related object types and occurrences of the object listing are arranged in a hierarchical tree to show the relationships between the object types and occurrences. The object occurrences 58 are placed directly beneath object types 56 and the related object types for an object occurrence are beneath and indented from the object occurrence. The object listing 54 was created interactively with the user selecting options from menus of related object type options. The object listing 54 shows a sample of selected object occurrences and types, and relationships between objects in the distributed system. The user is able to navigate through the object relationships to produce the displayed object listing without having to have detailed knowledge of the host computer systems in the distributed system, such as the host systems, the databases in the system, or the tables in the databases.

The initial object listing type is "Host" (referring to a host computer system). Displayed beneath the "Host" object type in the object listing 54 is the list of host occurrences of the host object type in the distributed system comprising the occurrence "STLMVS1" 66. This object listing is not a complete listing of the objects in the system. For example there may be other host occurrences in the system. The reason there is only one host occurrence could be because the occurrences to be displayed were qualified to narrow the number of occurrences that are displayed (which will be explained below) or the other host occurrences may have been scrolled off the screen as the user modified the object listing while navigating through the related object types and occurrences for this host.

The next level of detail displayed is the related object type "RDB" 67 referring to the relational databases which are available in the host system STLMVS1. The occurrences of the object type RDB for the host STLMVS1, displayed as part of the object listing 54, are POKDB231 68 and POKDB326 69.

The indentations and relative positioning of the related object types 56 and occurrences 58 tie together the related objects and illustrate the relationships. Lines 70 are also used to further connect the related object types and occurrences.

Continuing down the level of detail of the interactively navigated object relationships displayed as the object listing 54, an object type "database" 71 is the selected related object type displayed for the RDB object type occurrence POKDB326 69. The object type "database" 71 refers to the databases which exist for the RDB POKDB326 in the host system STLMVS1. The database in POKDB326 in STLMVS1 are POKDB326."PAYROLL" 72, POKDB326."FINANCE" 73, and POKDB326."STOCKCTL" 74. Since further navigation had been done of related object types and occurrence in the database POKDB326."PAYROLL" 71 and POKDB326."FINANCE" 72 the database occurrences 72–74 for POKDB326 are not all on adjacent rows.

Directly beneath and indented from the database occurrence POKDB326."PAYROLL" is the related object type "Bufferpool" 75 referring to the database bufferpools. The bufferpool POKDB326."BP32K" 76 has a selected related object type highlighted. "Bufferpool Auths" 77. "Bufferpool Auths" refers to the authorizations for the database POKDB326."PAYROLL" bufferpool POKDB326."BP32K". Displayed directly below "Bufferpool Auths" are the rows 78 with the occurrences of that object type with information on the user IDs having authority to use the bufferpool. Displayed beneath and indented from the database occurrence POKDB326."FINANCE" 73 is the related object type "Table" referring to the tables that are in that database. Displayed below "Table" 79 are the rows 80 of the tables in the database POKDB326."FINANCE" in the host system STLMVS1.

Figure 3A:
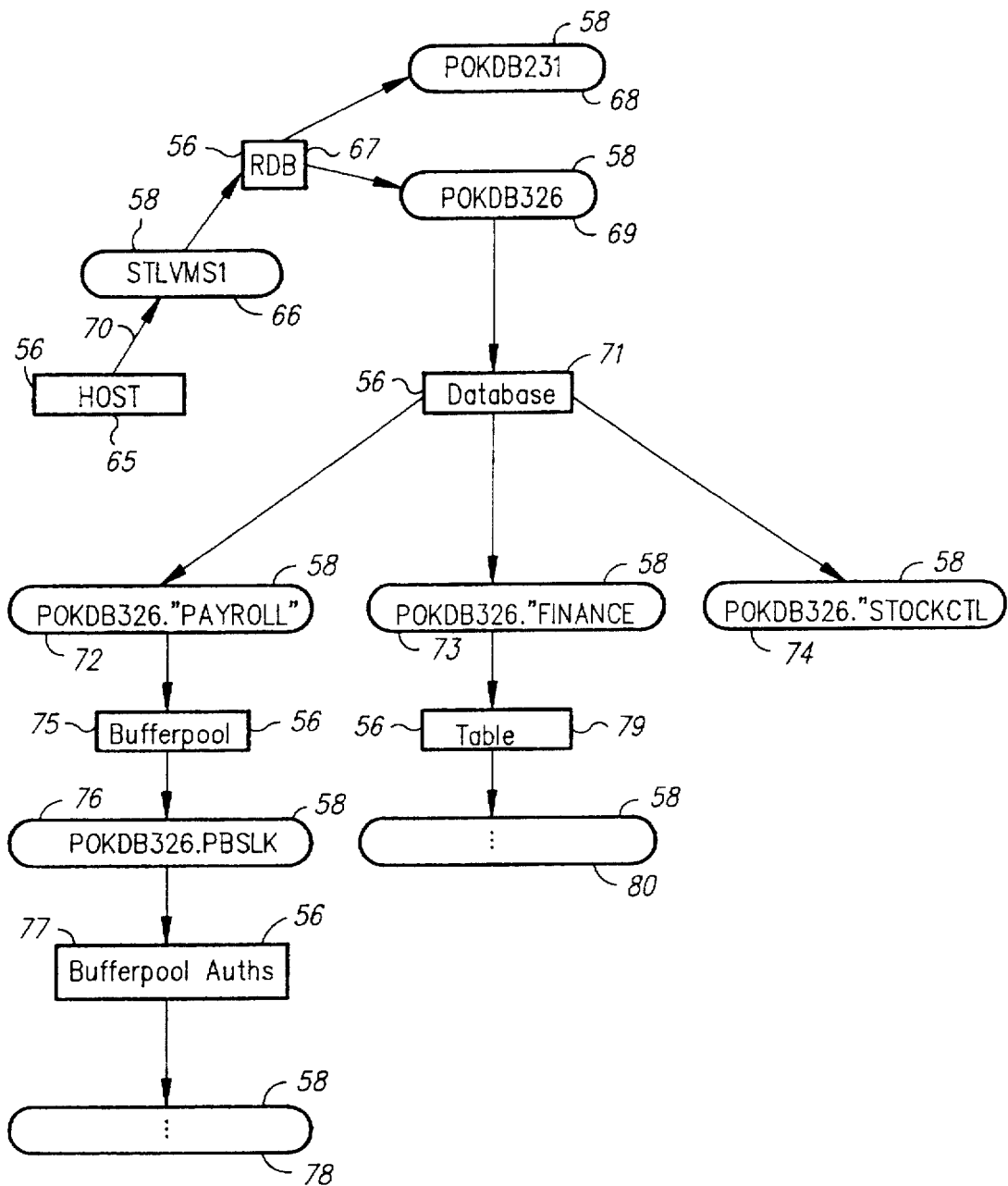
FIG. 3a is an alternate format of the object listing display of related object types and occurrences of FIG. 3.

Referring to FIG. 3a, an alternate network arrangement for the object listing is shown where the object occurrences 58 are arranged around object types 56 connected by (directed) lines 70.

A set of at least one table is used to dynamically define the relationships of the system objects and provide a dynamic list of performable actions. Referring to FIGS. 4 and 5, two tables used are the Object Action Table 81 and the Related Object Table 82. FIGS. 4 and 5 provide a logical illustration of the preferred embodiment of the Object Action Table and Related Object Table that are used. The "tables" can be a view of one or more other tables.

In the preferred embodiment, the Object Action Table and the Related Object Table are stored in the disk storage of the programmable work station (PWS) running the system. However, the table can be stored in the RAM or disk of any of the systems.

The Object Action Table 81 is constructed to contain entries that define the actions which can be performed against each object type and the function programs which perform the actions. The Object Action Table 81 comprises an action column 84, an object column 85, a type of object column 86, a database type column 87 and a program name column 88.

Examples of action column 84 values are display, copy, add, delete, and back up of the system. These are actions that a DBA needs to perform on system objects for system management. The object column 85 refers to the object for which the action in that row is performable. For example, object types listed in the same row having the action value "copy" can be copied. The type of occurrence column 86 indicates whether the action pertains to an object type, an object occurrence or is valid for both object types and object occurrences. The database column 87 indicates whether the action can only be performed on the corresponding object in the particular system listed. When there is no corresponding database entry for a row, then the action is valid for the object on all database systems. The program name column 88 provides the program name of the program or set of instructions for performing the actions such as displaying, copying, adding and deleting a particular object. There are more than one table entry for many of the actions (e.g., "Display") for different objects. There are also more than one entry for the same object-action pair (e.g., Backup-Table) where different programs are used for different systems. The same program (e.g., EMQSTIN.EXE) can also be used by more than one object type with appropriate parameter substitutions.

There are two main functions of the Object Action Table. The first function is providing a list of performable actions for a selected object type. The object type is used as a key to identify corresponding entries for performable actions. The retrieved list of performable actions is displayed in a user selection menu of performable actions for a selected object.

The Object Action Table also performs the function of identifying the program to run to perform a selected action on a selected object. The selected object and action are used as keys to the table to find the program name in the row where both selected object and action values are found. For each entry in the Object Action Table, a computer program or a list set of instructions for performing the action on the selected object in the database is designed and stored in the system. The program used to retrieve the occurrences is stored on the disk in the computer system where the object occurrences are stored. The program could be stored in the RAM or disk of any system. Another key used for identifying the program is the database system type which is inherently identified during the navigation process from the host database.

The Object Action Table is primed with the necessary entries. For example, the Object Action Table has an entry row having "Display" 90 as the action and the object type as HOST 91 and the program HDISP 92. The Object Action Table is used to identify the program name. HDISP by locating the object type (HOST) and action (DISPLAY) pair in the Object Action Table. The CPU then runs the HDISP program. That program retrieves the occurrences of that object type. Since the action is display, the list of occurrences is displayed for the specific object type. The entries from the return list of occurrences is then added to the display window.

The related object types are identified using a Related Object Table 82 as shown in FIG. 5. The Related Object Table 82 comprises an object column 94, a related object type column 95, a database type column 96, and a qualifier column 97. A user selected object provides a key for the list of related object entries having the selected object in that row. The table is also used to identify valid qualifier types of related object types. These values are retrieved using the selected object and related object type as keys. As will be described in greater detail later, the user can select a qualifier type and enter a value in order to narrow the occurrences that are retrieved for a related object type.

The Related Object Table must be primed with the necessary entries to define the relationships between the various object types. For example, the table contains entries to define a relationship of TABLE 98 to VIEW 99 and TABLE 100 to AUTHS 101 by having two separate rows having TABLE as the object type with corresponding related object type entries of "VIEW" and "AUTHS work". There is further repetition for all of the applicable qualifiers to each object-related object pair.

The logic of generating the objects and occurrences and the object relationships is placed in the Related Object Table and the Object Action Table instead of embedding the information into the display and navigation code.

The process used for adding a new object type consists of registering the object type by assigning an object ID and icon to the new object and then using the newly assigned object ID. The new object's relationships are then added to the relational object table. New object actions and programs to be called are added to the Object Action Table.

The process for interactively navigating related object types and occurrences producing an object listing such as the one shown in FIG. 3 using the tables shown in FIGS. 4 and 5 is explained in further detail with reference to the flowchart in FIG. 6.

Figure 6:
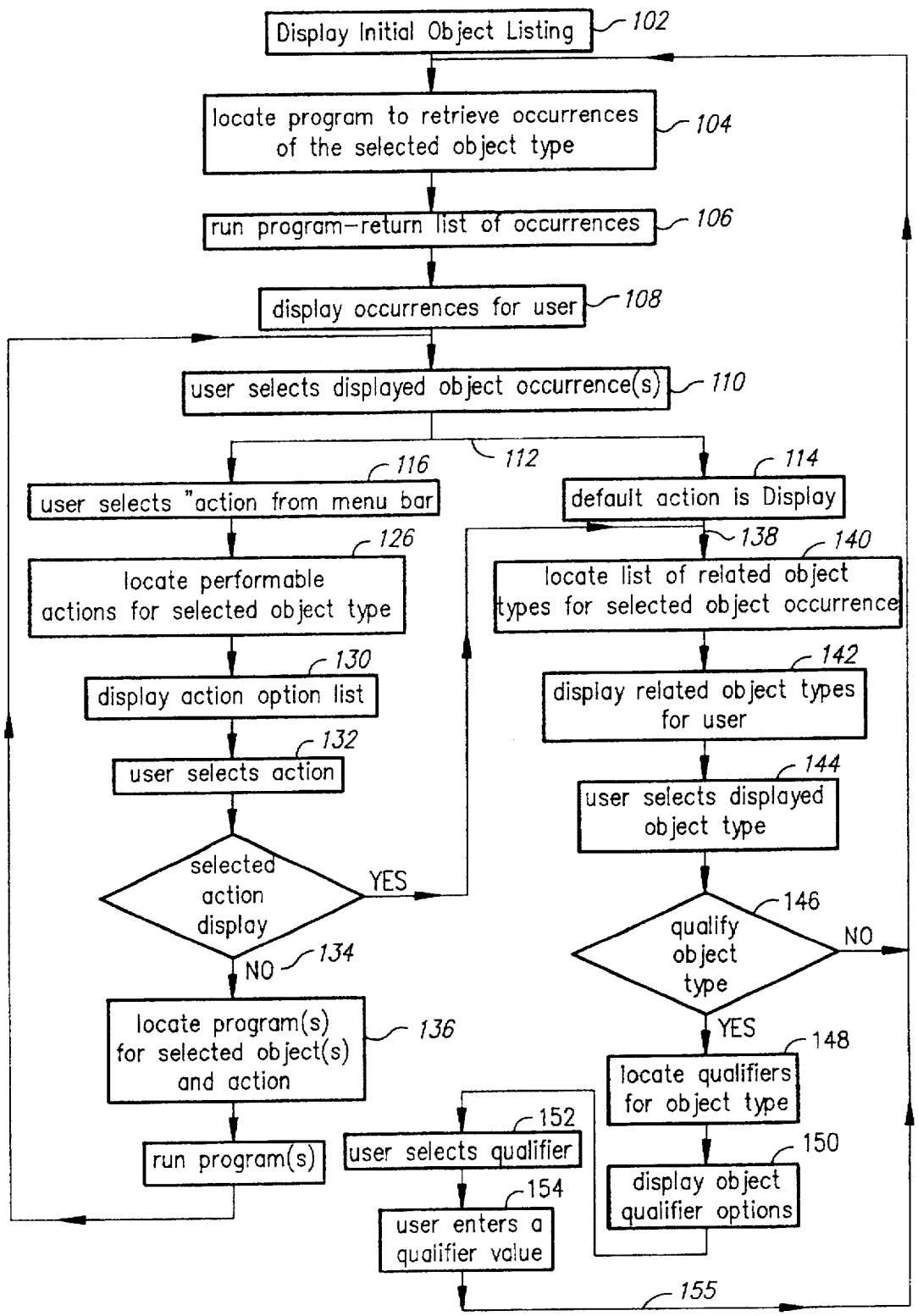
FIG. 6 is a flowchart of the invention.

Referring to FIG. 6, an initial object listing is displayed in the window 102. In the preferred embodiment the initial object listing consists of a single object type (such as "host"). The user clicks on the object type and the occurrences for the object type are displayed.

The object type occurrences are retrieved using a program stored in the distributed system and executed by the CPU. The occurrence retrieval program is identified by locating the program to retrieve the occurrences of the selected object type 104 using the Object Action Table 81.

The retrieval program is run and the list of occurrences is returned 106 and displayed for the user on the display screen 108. The user then selects a list of one or more displayed object type occurrences 110 and an action to be performed on the list 112.

In the preferred embodiment, the default action used in selecting and navigating through the interactively displayed network of related object types and occurrences is the display action. The user can use a mouse to double click on an object instance to select the default action of display 114. Alternatively, referring to FIG. 6, the menu bar at the top of the display screen is used to select an action 116. The action options are retrieved from the Object Action Table 81.

Figure 7:
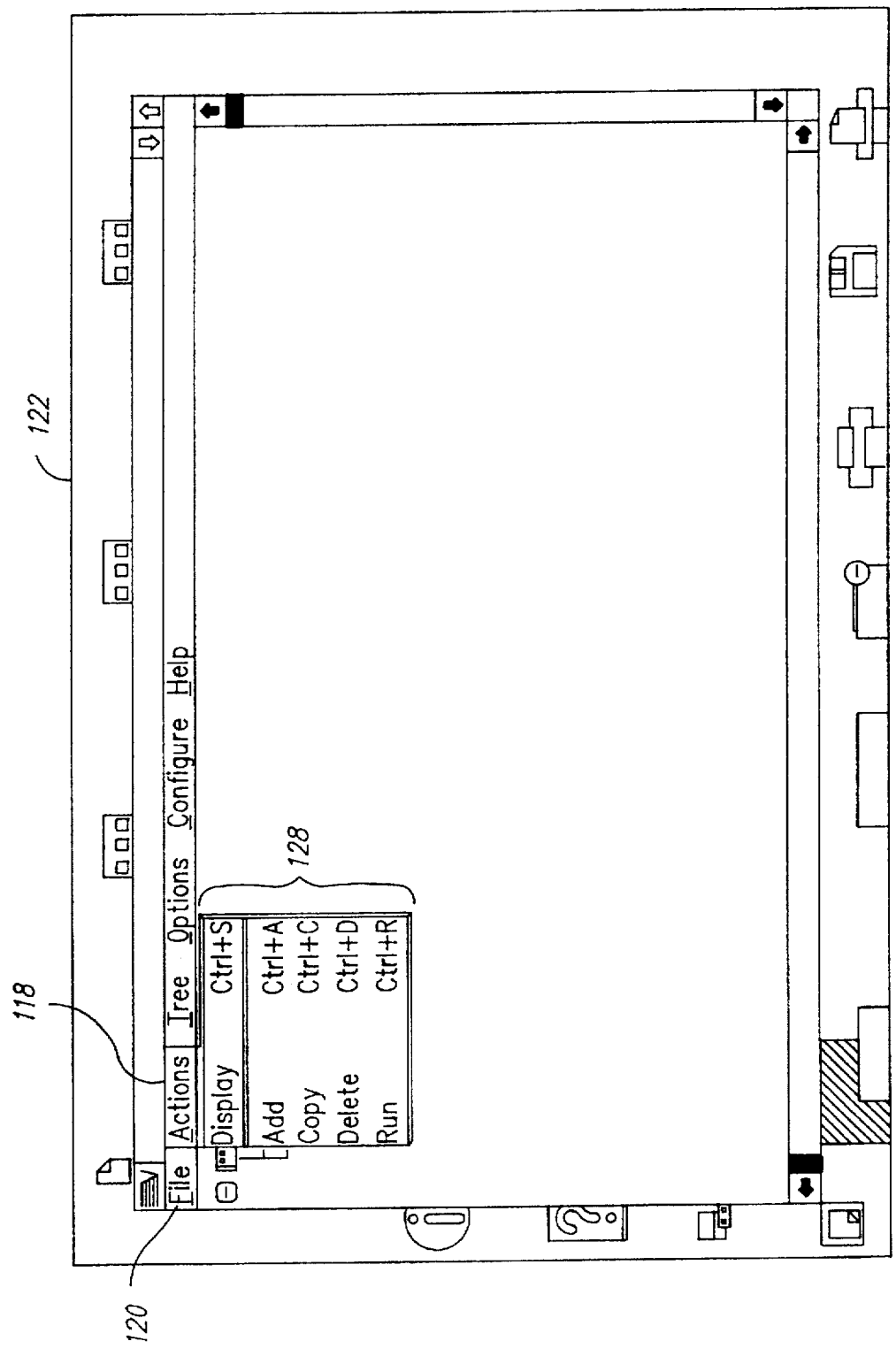
FIG. 7 displays a window with an action option menu according to a preferred embodiment of the present invention.

Referring to FIG. 7, when "Actions" 118 is selected from the menu bar 120 at the top of the window 122, the Object Action Table is accessed to identify a list of performable actions for the selected object type (see 126 in FIG. 6). The list of performable actions is then displayed in the object action menu 128 (see 130 in FIG. 6).

The list of actions in the menu is dynamic and can change depending on the selected object occurrence. In FIG. 7, the performable actions for the selected object displayed in the menu 128 include: Display, Add, Copy, and Delete. The selected object can have one of these actions performed on it, as needed by the DBA to manage the distributed system. Since the information is all stored using tables, changes needed to be made to reflect changes in the systems are made to the table and not to any of the logic used in providing the table.

Referring to FIG. 6, the user selects an action using a keyboard, mouse, or other interaction device 132. When the user selects an action other than "Display" 134, the Object Action Table is accessed to identify the program or programs to run to perform the selected action on the selected object and the program is run by the CPU 136.

The user can select more than one object occurrence to perform an action on multiple objects at one time by depressing the mouse and highlighting more than one occurrence. In that case, the Object Action Table is accessed for each of the object occurrences and a number of programs are executed to perform the action requested for all of the selected objects. For example, if multiple tables are to be copied, then the user would highlight a group of tables and choose the action of copy and the Object Action Table would be accessed to identify the program to be run for copying each of the tables that was selected.

For the action of display (both selected as the default and from the action menu) 138, a menu of related object types for the selected object occurrence is displayed. The related object types for a selected object occurrence are identified using the Related Object Table 140. The related object type list is then displayed for the user 142. The user selects a displayed object type using the mouse or other user interaction device 144.

The related object type can be qualified to limit the object occurrences that are displayed 146. A list of qualifiers for the selected object type is identified using the Related Object Table 148. The list of qualifier types is displayed for the user in a portion of the window 150. The user selects a qualifier 152 and then enters a value for the qualifier 154.

After the related object type is selected and optionally qualified, the Object Action Table is used to identify the program to run to retrieve the occurrences of the selected object type 104. The program is run and the list of occurrences is retrieved 106. The list of occurrences is displayed to the user and the process continues 155.

The process of navigating through object relationships in greater levels of detail is further explained with reference to FIGS. 8 through 12.

Figure 8:
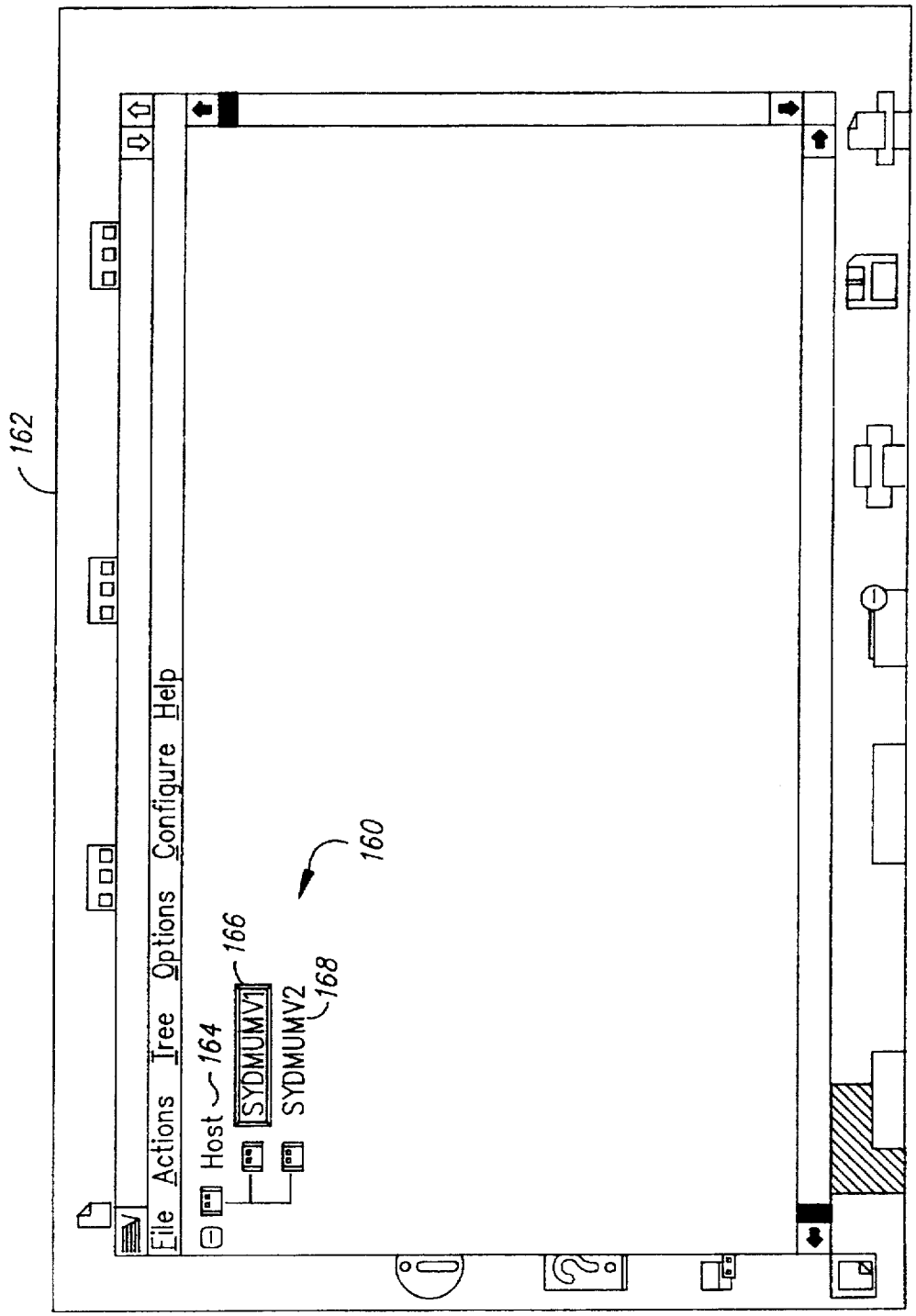
FIG. 8 displays a related object type and occurrences with a user selected object occurrence highlighted according to a preferred embodiment of the present invention.

Referring to FIG. 8, the object listing 160 displayed in the window 162 consists of two object occurrences for the object type "Host" 164, SYDMUMV1 166 and SYDMUMV2 168. The user selected SYDMUMV1 166 which is highlighted. The user also selected "Display" as the action to be performed either using the menu bar or signalling a default action by double clicking on the occurrence with the mouse.

Figure 9:
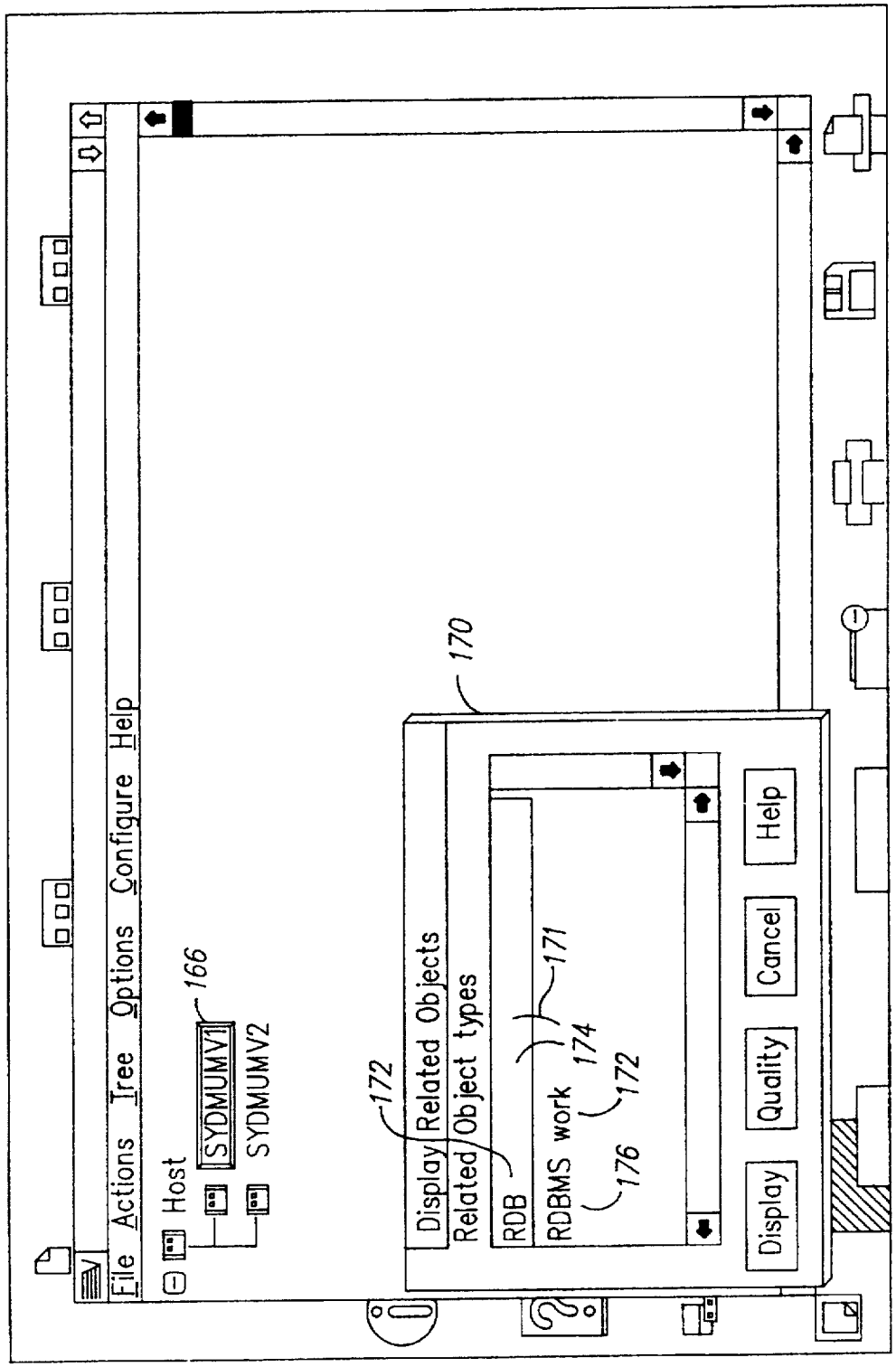
FIG. 9 is the display of a related object type menu resulting from the selection of FIG. 8.

Referring to FIG. 9, a pop-up window 170 displays a menu 171 of the related object types 172 for the selected host system occurrence SYDMUMV1 166. The related object type options are RDB 174 and RDBMS work 176. The object types of "RDB" and "RDBMS work" were identified using the Related Object Table. The object type "Host" was used as a key to identify the related object types RDB and RDBMS work. The user selected the displayed related object type RDB 174 which is highlighted.

Once a related object type is selected by the user to be displayed, the Object Action Table is accessed to identify the name of the program that is executed by the CPU to retrieve occurrences of the selected object type.

Figure 10:
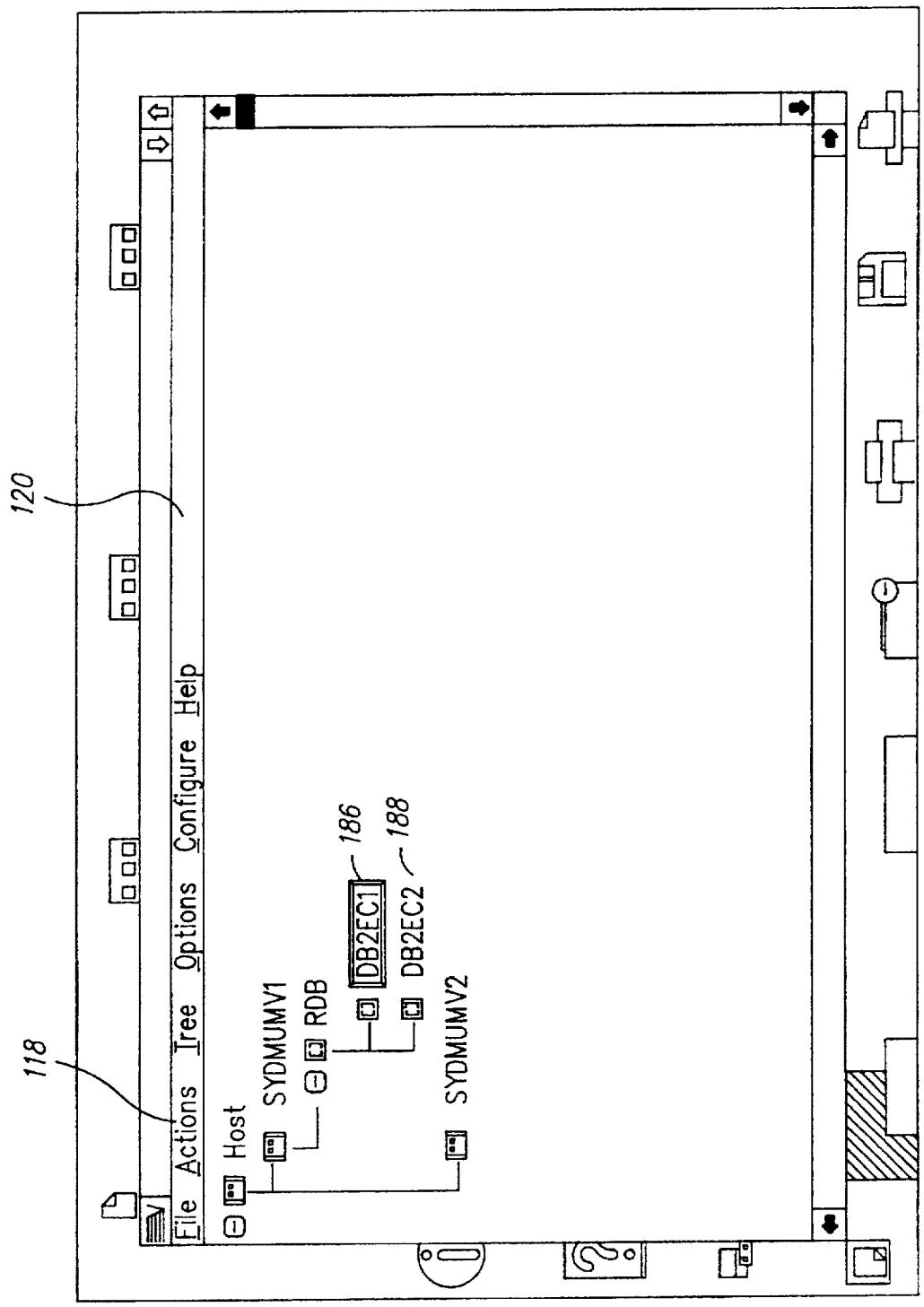
FIG. 10 is the object listing resulting from the selection of FIG. 9.

The RDB object occurrences in SYDMUMV1, DB2EC1 186 AND DB2EC2 188 are displayed for the user as shown in FIG. 10.

Referring to FIG. 10, the user selected one of the displayed object occurrences DB2EC1 which is highlighted. The process continues until the user finds and selects the desired instances with which an action other than the default action of display is to be performed (by clicking on the "Action" option 118 in the menu bar 120).

Figure 11:
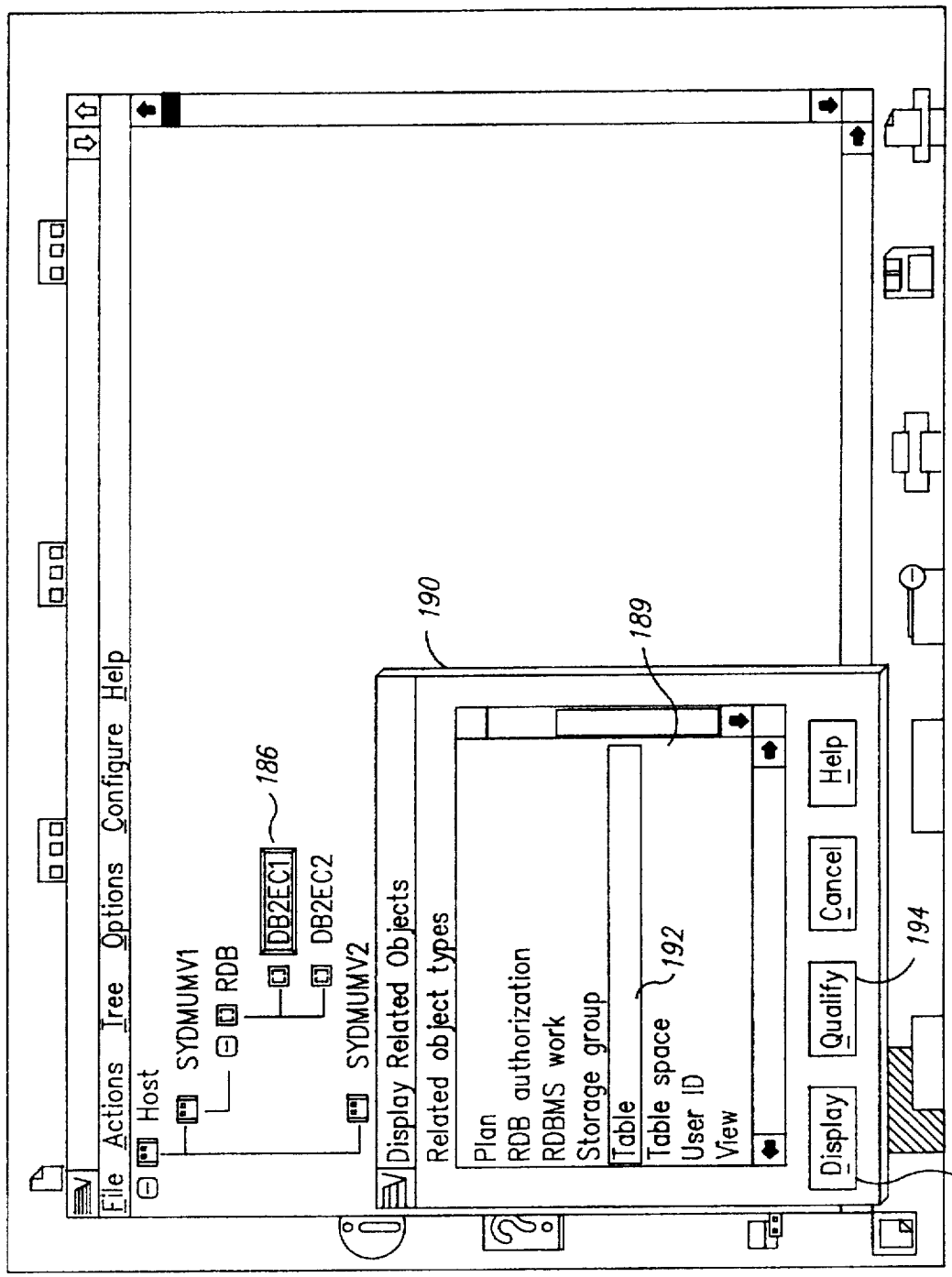
FIG. 11 is the object listing resulting for the selection in FIG. 10 with a displayed related object type option menu.

Referring to FIG. 11, the user selected the default action of "Display" for object occurrence of DB2EC1 186 and the Related Object Table was accessed to identify the list of related object types shown in the menu 189 of the pop-up window 190. The list of related object types for the RDB DBEC1 include "Plan", "RDB Authorization", "RDBMS work", "Storage Group", "Table", "Table Space", "User ID", and "View". The user selected the related object type "Table".

The related object types are objects that are logically definable in terms of the object type to which it is related. The related object types can be defined (using the Related Object Table) to limit navigation to the next level of detail (e.g., not go from Host directly to all Views in the Host) or require the related object to be limited in one direction (e.g., navigate from a Host to Tables, but not from a Table to Hosts). The related objects can also be circular, where the authorization IDs on a table are displayed and then for an authorization ID all tables are displayed.

In Display Related Objects window 190, the user has the option of selecting "Display" 193 or "Qualify" 194. When the user selects "Display", all of the occurrences of the selected object type (related to the selected object occurrence) are displayed. When the user selects the "Qualify" option, a new window 198 is displayed as shown in FIG. 12, used for qualifying the selected related object type, in order to limit the related object type occurrences displayed as part of the object listing.

Figure 12:
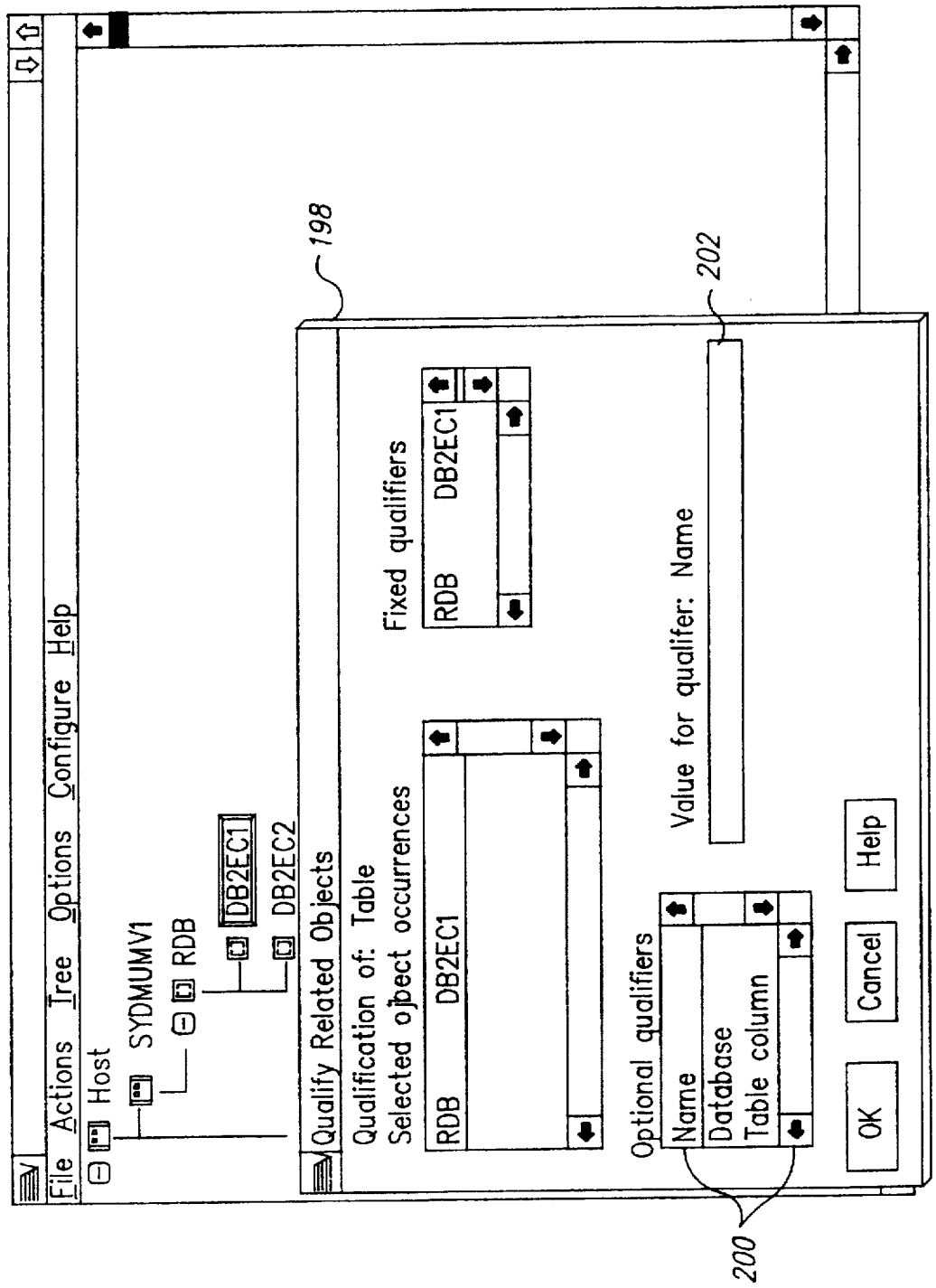
FIG. 12 is a display of an object listing and qualifier menu resulting for the selection in FIG. 11.

Referring to FIG. 12, the menu qualifiers 200 are identified using the Related Object Table. The object type, related object type and database type are used as a key to find corresponding qualifier type entries. The list of qualifier types available for the selected related object type is displayed in the qualifier menu window 198. Some of the qualifiers for retrieving tables in DB2EC1 in SYDMUMV1 are "Name", "Database", and "Table Column". The user selected the qualifier "Name" which is highlighted and enters a qualifier value in the space provided 202 using a keyboard to enter the name for the table to be retrieved. The Name value entered by the user provides a parameter for the program (identified in the Object Action Table) executed by the CPU to retrieve the DB2EC1 table occurrences. That is, the retrieval program will only retrieve occurrences of the related object type (table), for the selected object occurrence (DB2EC1), that have the value for the qualifier type (name) provided by the user.

The user continues navigating to identify system objects until the system object or objects are displayed (identified) with which the user wants to perform an action other than Display, such as backing up, copying, adding or deleting the selected object(s). The object listing and the action listing are context sensitive (that is, sensitive to the previous objects that were displayed) and dynamically obtained (using information stored in tables). The user (e.g., DBA) can thus manage the distributed system without having to know the syntax and commands of the operating systems and DBMSs of the host systems (or even what host systems are in the distributed network).

While the invention has been particularly shown and described with reference to a preferred embodiment thereof, it will be understood by those skilled in the art that various other changes in the form and details may be made therein without departing from the spirit and scope of the invention. For example, the various tables mentioned herein may actually be structured as described or may be split into multiple tables to provide for normality of data. Accordingly, the method and system herein disclosed are to be considered merely as illustrative and the invention is to be limited only as specified in the claims.

We claim:

1. A program storage device, readable by a machine, tangibly embodying a program of instructions executable by the machine to perform method steps for managing a distributed data processing system, wherein the machine having a display device and user interaction device, said method steps comprising:
   (1) displaying on the display device an object listing of related data processing system object types and displaying object occurrences corresponding to each of the displayed object types;
   (2) interactively modifying said object listing using input from the user interaction device and control information accessible from a set of at least one table stored in the distributed system;
   (3) interactively selecting an action to be performed on a user selected list of at least one object occurrence from said object listing using input from the user interaction device and control information from a set of at least one table stored in the distributed system; and
   (4) performing the selected action on the selected object occurrence list, by means of the machine executing a list of at least one program stored in the distributed system, wherein the program list is identified using a set of at least one table stored in the distributed system.

2. The program storage device of claim 1, further comprising the step of displaying a dynamic action listing on a portion of the display device, said action listing comprising at least one action performable on the user selected object occurrence list, wherein said action listing is produced by accessing a set of at least one table stored in the distributed system.

3. The program storage device of claim 1, wherein step (3) comprises the steps of:
   (a) selecting from the object listing by means of the user interaction device, a list of at least one object occurrence;
   (b) displaying on a portion of the display device a list of at least one action, wherein each action in the action list is identified using the selected object occurrence as a key to identify at least one action entry in an action table; and
   (c) selecting, by means of the user interaction device, an action from the displayed action list.

4. The program storage device of claim 1, wherein step (2) comprises the steps of:
   (a) receiving input from the user interaction device selecting an object occurrence from the displayed object listing;
   (b) displaying, on a portion of the display device, a list of object types related to the selected object occurrence, wherein the related object types are identified using the selected object occurrence as a key to identify at least one object type entry in a Related Object Table;
   (c) receiving input from the user interaction device selecting a related object type from the displayed list of related object types;
   (d) retrieving occurrences of the selected related object type using an object occurrence program executed by the machine, wherein the object occurrence program is identified using the selected related object type as a key to identify a program entry in an Object Action Table;
   (e) displaying the occurrences of the selected related object on the display device as part of the object listing; and
   (f) repeating steps (a) through (e) a plurality of times until input is received from the user interaction device to perform an action other than display.

5. The program storage device of claim 4, further comprising the steps of:
   (g) displaying a list of qualifiers for the selected related object type in response to input received from the user interaction device, wherein the list of qualifiers for a related object type is identified using a related object qualifier table;
   (h) receiving input from the user interaction device selecting a qualifier from the qualifier list;
   (i) receiving input from the user interaction device identifying a qualifier value; and
   (j) retrieving related object type occurrences having the qualifier value by using the qualifier value as a parameter for the selected program.

6. The program storage device of claim 1, wherein the object listing is in the form of a hierarchical tree with related object occurrences displayed indented beneath the corresponding object type.

7. The program storage device of claim 1, wherein the object listing is displayed in the form of a network of object occurrence nodes connected to object type nodes.

8. The program storage device of claim 1, wherein the object listing is context sensitive and dynamically obtained and the performable action lists are context sensitive and dynamically obtained.

9. A program storage device readable by a machine, tangibly embodying a program of instructions executable by the machine to perform method steps for managing a distributed data processing system, wherein the machine having a display device and user interaction device, said method steps comprising:
   (1) displaying, on the display device, a list of at least one occurrence of a computer system object type;
   (2) receiving input from the user interaction device selecting a displayed object occurrence;

(3) identifying a list of at least one qualifiable object type related to the selected occurrence type using a set of at least one table stored in the distributed system;

(4) displaying the related object type list on a portion of the display device;

(5) receiving input from the user interaction device selecting a related object type;

(6) retrieving a list of at least one occurrence of the selected object type using a program stored in the distributed system, wherein the program is identified using a set of at least one table stored in the distributed system;

(7) displaying the retrieved object occurrence list;

(8) repeating steps (2) through (7) a plurality of times until input is received from the user interaction device to perform a non-display action on a user selected list of at least one object occurrence;

(9) identifying a list of at least one performable action for the selected object occurrence list using a-set of at least one table stored in the distributed system;

(10) displaying on a portion of the display device the performable action list;

(11) receiving input from the user interaction device selecting an action from the displayed performable action list;

(12) performing the selected action on the selected occurrence list, using a list of at least one program, wherein the action program list is identified using a table stored in the distributed system; and

(13) repeating steps (2) through (12) a plurality of times until input is received from the user interaction device to stop.

10. The program storage device of claim 9, further comprising the step of:

(14) adding a new object occurrence to the system by adding at least one entry to the set of at least one table;

(15) adding a new object relationship to the system by adding at least one entry to the set of at least one table; and

(16) adding a new performable action for an object type to the system by adding at least one entry to the set of at least one table and storing in the distributed system a program executable by the machine to perform the new action on the object type.

11. The program storage device of claim 9, wherein at least one program is used to perform an action for more than one type of object type, having at least one parameter passed to the program for the object type.

12. The program storage device of claim 9, wherein a computer system object type for a selected object occurrence is used as a partial key for the table set and as a parameter for the program.

13. A computer program product for use with an user interactive device and a display device, in a distributed data processing system, said computer program product comprising:

a computer usable medium having a computer readable program code means embodied in said medium for causing the interactive display of a list of related objects stored in the data processing system, said computer readable program code means comprising:

computer readable first program code means for displaying a list of occurrences of a computer system object type on the display device;

computer readable second program code means for receiving input from the user interaction device selecting a displayed object occurrence;

computer readable third program means for causing a computer to identify a list of at least one object type related to the selected object occurrence using a table stored in a memory of the computer; and computer readable third program means for causing the computer to identify a list of at least one occurrence of the selected object type using a program stored in the memory of the computer, wherein the program is identified using a set of at least one table stored in the memory.

* * * * *